Figure 1:
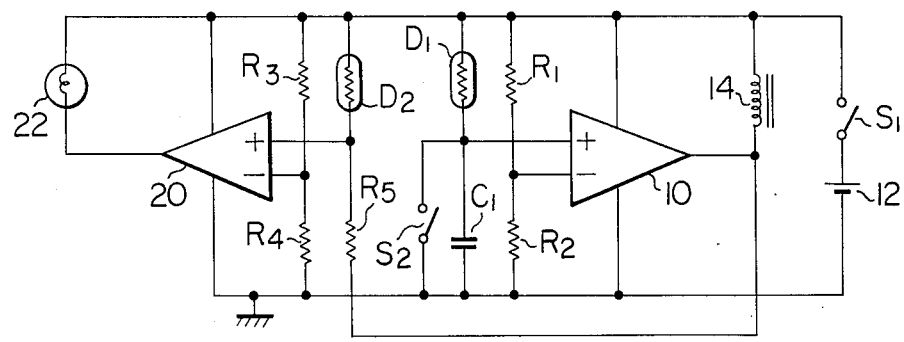

United States Patent [19]

Iguchi et al.

[11] 4,027,314
[45] May 31, 1977

[54] SHUTTER AND LOW-LIGHT INDICATOR ACTUATING DEVICE FOR A CAMERA

[75] Inventors: Susumu Iguchi; Masamichi Furukawa, both of Tokyo, Japan

[73] Assignee: Ricoh Co., Ltd., Tokyo, Japan

[22] Filed: Oct. 16, 1975

[21] Appl. No.: 623,164

[30] Foreign Application Priority Data

Oct. 21, 1975 Japan .............................. 50-120355

[52] U.S. Cl. .................................. 354/31; 354/51; 354/60 L
[51] Int. Cl.² ........................................ G03B 7/08
[58] Field of Search ................. 354/31, 50, 51, 53, 354/60 R, 60 L

[56] References Cited
UNITED STATES PATENTS 3,709,113  1/1973  Wood .......................... 354/60 L X
3,860,936  1/1975  Harvey .............................. 354/51

*Primary Examiner*—Joseph W. Hartary
*Attorney, Agent, or Firm*—Frank J. Jordan

[57] ABSTRACT

Voltage comparators for actuating a camera shutter and a low-light indicating lamp respectively have inputs connected to junctions between photocells and resistors so as to be controlled in response to the light level. The voltage comparator for the low-light indicator energizes the indicator when the light level is below a low-light value from the time the shutter release button is partially depressed until the time the shutter is closed after the exposure. The voltage comparator for the shutter produces a shutter opening signal to open the shutter for the required length of time based on the light level. The output of the voltage comparator for the shutter is connected through a diode to the input of the voltage comparator for the low-light indicator so that the low light indicator is deenergized when the shutter is closed.

6 Claims, 2 Drawing Figures

SHUTTER AND LOW-LIGHT INDICATOR ACTUATING DEVICE FOR A CAMERA

The present invention relates to a shutter and low-light indicator actuating device for a camera.

In electronic cameras, it is desirable to provide a low-light indicator light which is energized when the incident light is below a certain value, the lens aperture is fully open and the computed shutter opening time is long enough that there is danger of blurring the picture by moving the camera when the camera is hand-held. It is further desirable to maintain the light on until the exposure is completed, especially with exposures of over one second. Various devices comprising switches have been devised to perform this function. However, switches are bulky and are not compatible with the miniaturization of electronic cameras. Furthermore, switches are subject to mechanical failures such as caused by increased contact resistance resulting from prolonged use.

A device has been proposed for use in the KODAK INSTAMATIC 60 (trade name) camera in which an input for a Schmitt trigger for controlling a low-light indicator bulb is connected to a battery terminal through another Schmitt trigger which is used for actuating the shutter while the shutter is open. Whereas this device is generally effective, it suffers from a serious drawback in that the internal resistance of the Schmitt trigger for the shutter varies in dependence on ambient conditions such as temperature, humidity and the like to such a degree that the operation of the Schmitt trigger for the indicator bulb is erratic, especially under low-light conditions when the operation must be exact.

It is therefore an important object of the present invention to provide a shutter and low-light indicator actuating device which overcomes the drawback of the prior art by connecting an actuator means for an indicator light to a power source through a path which does not include a Schmitt trigger or equivalent device.

It is another important object of the present invention to provide a shutter and low-light indicator actuating device which comprises a diode connected between the output of a voltage comparator utilized to actuate a camera shutter and the input of a voltage comparator utilized to actuate a low-light indicator light.

Figure 2:
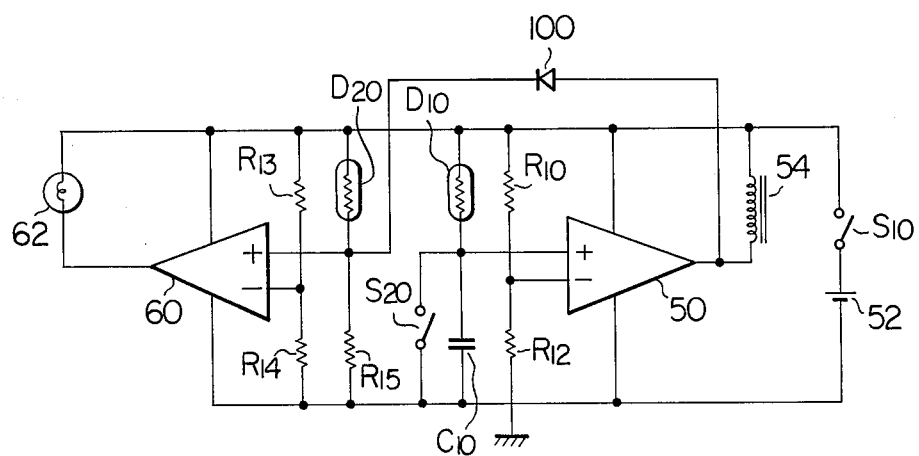

The above and other objects, features and advantages of the present invention will become apparent from the following detailed description taken with the accompanying drawings, in which:

FIG. 1 is an electrical schematic diagram of a prior art shutter and low-light indicator device to which the present invention is an improvement; and FIG. 2 is an electrical schematic diagram of a shutter and low-light indicator device embodying the present invention. Referring now to FIG. 1, a prior art shutter and low-light indicator actuating device similar to that utilized in the KODAK INSTAMATIC 60 (trade name) camera comprises a voltage comparator 10 which acts as a camera shutter actuating means and has an output connected to a positive terminal of a battery 12 through a shutter solenoid 14 and a switch S1. The voltage comparator 10 also has supply inputs (no numerals) connected to the positive and negative terminals of the battery 12 in series with the switch S1. A negative control input of the voltage comparator 10 is connected to the junction of resistors R1 and R2 which are connected in series with the switch S1 to the battery 12. The series combination of a photoconductive diode D1 and a capacitor C1 is connected in parallel with the series combination of the resistors R1 and R2, with the junction of the diode D1 and the capacitor C1 being connected to a positive control input of the voltage comparator 10. A switch S2 is connected in parallel with the capacitor C1. A voltage comparator 20 which serves as an actuator means for a low-light indicator light 22 has source inputs (no numerals) connected to the source inputs of the voltage comparator 10. The light 22 is connected between an output of the voltage comparator 20 and the switch S1. Resistors R3 and R4 are connected in a series combination which is further connected in parallel with the series combination of the resistors R1 and R2. The junction of the resistors R3 and R4 is connected to a negative input of the voltage comparator 20. A photoconductive diode D2 is connected between a positive input of the voltage comparator 20 and the switch S1. A resistor R5 is connected between the positive input of the voltage comparator 20 and the output of the voltage comparator 10.

The resistors R1 and R2 constitute a voltage divider for the negative input of the voltage comparator 10 so that a predetermined voltage is constantly applied thereto. The voltage comparator 10 is so arranged as to produce a positive output voltage or shutter opening voltage when the voltage at the positive input thereof is higher (more positive) than the voltage at the negative input thereof. The voltage comparator 20 and the resistors R3 and R4 are connected in the same arrangement as the voltage comparator 10 and resistors R1 and R2 except that the values of the resistors are different. The photoconductive diodes D1 and D2 are arranged so that the resistance thereof decrease as the light incident thereon increases so that the voltages at the positive inputs of the voltage comparators 10 and 20 increases as the sensed light level increases.

The switch S1 is connected to a shutter release button of the camera (not shown) so that the switch S1 is closed when the shutter release button is partially pressed. The switch S2 is normally closed and adapted to be opened as will be described below.

In operation, the photographer aims the camera at the scene he wishes to photograph so that the light from the scene is incident on the photoconductive diodes D1 and D2, the resistance of which varies depending on the incident light level. The photographer then partially depresses the shutter release button thereby closing the switch S1 and connecting the battery 12 to the device. Since the switch S2, is closed, the capacitor C1 is shorted out and the voltage at the positive input of the voltage comparator 10 is equal to the battery 12 negative terminal voltage, which may be considered as ground for simplicity of description as indicated in FIG. 1. Since the voltage at the positive terminal of the voltage comparator 10 is lower than the voltage at the negative terminal thereof, the voltage comparator 10 produces a low output or shutter opening voltage which is substantially equal to ground. The photoconductive diode D2 and the resistor R5 are effectively connected in series between the positive and negative terminals of the battery 12 through the switch S1 and the voltage comparator 10 since the output voltage of the voltage comparator 10 is substantially equal to ground. The values of the resistors R3 and R4 are selected so that the voltage at their junction is a predetermined low-light voltage corresponding to the minimum light level at which the camera can be safely hand-held. If the incident light is above this level, the resistance of the photoconductive diode D2 will be low so that the voltage at the positive input of the voltage comparator 20 will be higher (more positive) than the low-light voltage at the negative terminal thereof. The voltage comparator 20 will produce a high output voltage which is substantially equal to the voltage at the positive terminal of the battery 12 so that the light 22 will have substantially no voltage difference thereacross and will not be lighted. On the other hand, if the incident light is below the low-light level, the resistance of the photoconductive diode D2 will be high so that the voltage at the positive input of the voltage comparator 20 will be lower than the voltage at the negative input thereof so that the voltage comparator 20 will produce a low output or indicator actuating voltage which will energize the light 22 and inform the photographer that he should either place the camera on a tripod or similar solid support or use a flash.

Although the camera shutter is not shown, it may be a known focal plane type which comprises two curtains; a first curtain which is biased toward an open position and is latched closed when the shutter is cocked and a second curtain which is biased toward a closed position and may be opened by the solenoid 14.

When the photographer presses the shutter release button partially to close the switch S1, the voltage comparator 10 produces the low shutter opening voltage as described above to energize the solenoid 14 and open the second curtain of the shutter. However, the first curtain is closed and the film will not be exposed. When the shutter release button is pressed further, the first curtain is mechanically tripped and released to move toward its open position. When the first curtain reaches the open position, it is arranged to open the switch S2. This allows the capacitor C1 to charge through the photoconductive diode D1 at a rate which is dependent on the resistance of the photoconductive diode D1 and therefore on the incident light level. If the light level is high the resistance of the photoconductive diode D1 will be low and the capacitor C1 will charge quickly, and vice-versa. When the voltage across the capacitor, which appears at the positive input of the voltage comparator 10 reaches the voltage at the negative input thereof, the voltage comparator 10 will produce a high voltage or shutter closing voltage which is substantially equal to the voltage at the positive terminal of the battery 12. This will cause the solenoid 14 to be de-energized and release the second curtain of the shutter to return to its closed position, thereby terminating the exposure of the film. Subsequent cocking of the shutter will cause the first curtain to be latched open and the switch S2 to close. The film, however, will not be exposed since the second curtain is closed.

It will be seen that the photoconductive diode D1 and the capacitor C1 constitute a variable integrator, and that the time required for the voltage at the positive input of the voltage comparator 10 to reach the voltage at the negative input thereof is a predetermined function of the incident light level. The shutter opening time is thereby controlled in accordance with the incident light level.

When the voltage comparator 10 produces a high output to terminate the exposure, this high voltage is also applied to the input of the voltage comparator 20. This voltage is arranged to be greater than the low-light voltage at the negative input of the voltage comparator 20, and the voltage comparator 20 will produce a high output voltage which will de-energize the light 22 indicating that the exposure is completed.

The above described device suffers from the serious drawback that the positive input of the voltage comparator 20 is connected to ground through the output circuit (not shown) of the voltage comparator 10 when the second curtain of the shutter is held open by the solenoid 14. Especially at low light levels at which the operation of the low-light indicator is especially critical, variations in ambient conditions such as temperature and humidity cause the output impedance of the voltage comparator 10 to be unstable to the extent that the operation of the low-light indicator becomes inaccurate.

This drawback is completely overcome in the embodiment of the present invention shown in FIG. 2. The embodiment shown is generally similar to the prior art device of FIG. 1.

A voltage comparator 50 has an output connected to a positive terminal of a battery 52 through a shutter solenoid 54 and a switch S10. The voltage comparator 50 also has supply inputs (no numerals) connected to the positive and negative terminals of the battery 52 in series with the switch S10. A negative control input of the voltage comparator 50 is connected to the junction of resistors R10 and R12 which are connected in series with the switch S10 to the battery 52. The series combination of a photoconductive diode D10 and a capacitor C10 is connected in parallel with the series combination of the resistors R10 and R12, with the junction of the diode D10 and the capacitor C10 being connected to a positive control input of the voltage comparator 50. A switch S20 is connected in parallel with the capacitor C10. A voltage comparator 60 which serves as an actuator means for a low-light indicator light 62 has source inputs (no numerals) connected to the source inputs of the voltage comparator 50. The light 62 is connected between an output of the voltage comparator 60 and the switch S10. Resistors R13 and R14 are connected in a series combination which is further connected in parallel with the series combination which is further connected in parallel with the series combination of the resistors R10 and R12. The junction of the resistors R13 and R14 is connected to a negative input of the voltage comparator 60. A photoconductive diode D20 is connected between a positive input of the voltage comparator 60 and the switch S10. A resistor R15 is connected between the positive input of the voltage comparator 20 and ground.

In accordance with an important feature of the present invention, the resistor R15 is directly grounded whereas the corresponding resistor R5 in the prior art device of FIG. 1 is grounded through the output circuit of the voltage comparator 10. The device of FIG. 2 further comprises, in combination, a diode 100 which has its anode connected to the output of the voltage comparator 50 and its cathode connected to the positive input of the voltage comparator 60.

The operation of the device of FIG. 2 is identical to that of FIG. 1 except for the following .

When the output of the voltage comparator 50 is low thereby energizing the solenoid 54 and opening the second curtain of the shutter, the diode 100 is reverse biased, thereby effectively disconnecting the output of the voltage comparator 50 from the input of the voltage comparator 60. The voltage comparator 60 can thereby operate in a much more stable manner than the voltage comparator 20 of the prior art device since the source of instability, namely the output circuit of the voltage comparator 50, is completely disconnected from the voltage comparator 60 and the resistor R15 is directly grounded rather than being grounded through the output circuit of the voltage comparator 50. The voltage comparator 60 can thereby operate much more accurately under critical low-light conditions.

When the output of the voltage comparator 50 becomes high as the exposure is completed, the diode 100 becomes forward biased thereby conducting the high voltage output of the voltage comparator 50 to the input of the voltage comparator 60. This causes the voltage comparator 60 to produce a high voltage output to de-energize the light 62 in the desired manner when the exposure is completed.

The voltage comparators 50 and 60 may be replaced by equivalent voltage controlled amplifiers such as Schmitt triggers which are used in the KODAK IN-STAMATIC 60 (trade name) camera. Other various modifications are possible for those skilled in the art within the scope of the present invention.

What is claimed is:

1. A shutter and low-light indicator actuating device, comprising:

shutter actuator means;

shutter opening light sensing means operative to apply an electric shutter opening signal to the shutter actuator means for a length of time depending on a sensed light level, the shutter actuator means being operative to normally produce at an output thereof an electric shutter closing voltage and to produce an electric shutter opening voltage in response to the shutter opening signal;

low-light indicator actuator means;

low-light sensing means connected to an input of the indicator actuator means operative to produce a low-light voltage when light sensed thereby is below a low-light level, the indicator actuator means being operative to normally produce an indicator de-actuating voltage and to produce an indicator actuating voltage in response to the low-light voltage; and a diode connected between the output of the shutter actuator means and the input of the indicator actuator means in such a manner that the diode is reverse biased by the shutter opening voltage and forward biased by the shutter closing voltage so as to conduct the shutter closing voltage to the input of the indicator actuator means, the indicator actuator means being operative to produce the indicator de-actuating voltage in response to the shutter closing voltage.

2. The device of claim 1, in which the shutter actuator means comprises a voltage controlled amplifier.

3. The device of claim 1, in which the indicator actuator means comprises a voltage controlled amplifier.

4. The device of claim 1, in which the shutter opening light sensing means comprises a light sensor and a timer.

5. The device of claim 4, in which the timer comprises an integrating circuit.

6. The device of claim 4, further comprising a shutter actuated switch operative to actuate the timer.

* * * * *